May 28, 1929.  C. B. THWING  1,715,316
THERMOPILE
Filed March 21, 1925
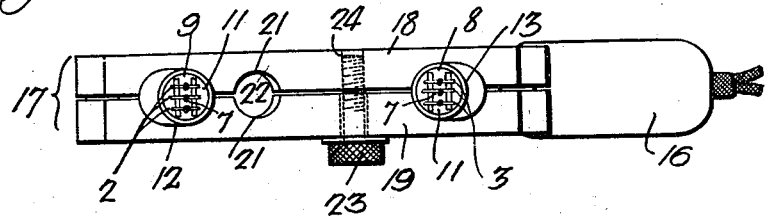
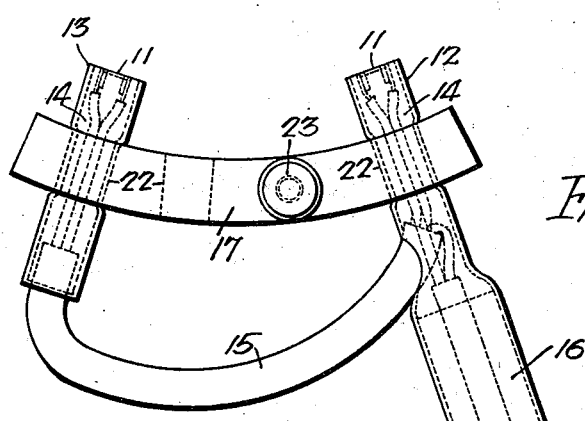
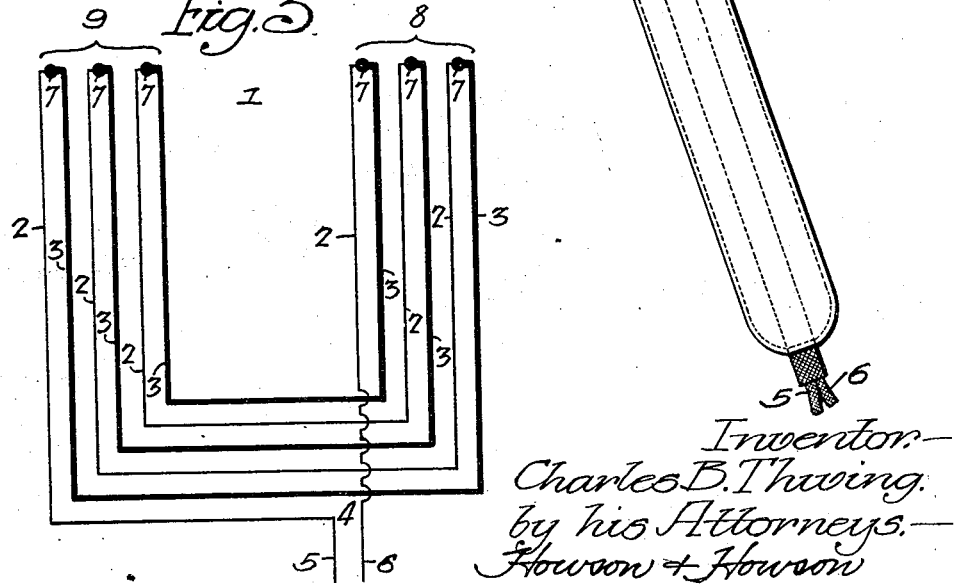
Inventor.—
Charles B. Thwing.
by his Attorneys.—
Howson & Howson Patented May 28, 1929.

1,715,316

UNITED STATES PATENT OFFICE.

CHARLES B. THWING, OF PHILADELPHIA, PENNSYLVANIA, ASSIGNOR TO THWING INSTRUMENT COMPANY, OF PHILADELPHIA, PENNSYLVANIA, A CORPORATION OF PENNSYLVANIA.

THERMOPILE.

Application filed March 21, 1925. Serial No. 17,203.

My invention relates to thermopiles, and it has particular relation to such devices as are applicable to medical purposes.

One object of my invention is to provide a thermopile that shall accurately indicate differences in temperature between various points on the surface of a body.

Another object of my invention is to provide a thermopile comprising a plurality of flexible positive and negative elements connected alternately in series circuit relation, the junction points being so arranged in groups as to afford an indication of temperature differences therebetween.

A further object of my invention is to provide a device of the class described, wherein alternate junction points of a thermopile are disposed in groups, and wherein the groups may be rigidly secured in any one of a plurality of spaced positions.

Other objects and applications of my invention, as well as details of construction and operation, whereby my invention may be practiced, will appear more fully hereinafter, when taken in connection with the accompanying drawing, wherein Figs. 1 and 2 are top plan and side elevational views, respectively, of one embodiment of my invention; and Fig. 3 is a diagrammatic view of the circuit arrangement of Figs. 1 and 2.

In order to facilitate the description of my invention, I have shown the same embodied in a medical instrument particularly applicable to the determination of temperature differences between spaced points on the human body, though of course my invention lends itself to various other uses and applications.

Referring particularly to Fig. 3, a thermopile 1 comprises a plurality of positive and negative elements 2 and 3 which are alternately connected in series circuit relation to form a continuous circuit 4, of which connectors 5 and 6 forming extensions of the positive elements 2, 2 constitute the external leads thereof. Each positive element 3 is connected intermediate a pair of negative elements 2, 2, thus forming junction points 7 at the opposite ends thereof. The currents established at one junction point thus balance those established at the preceding or succeeding junction point, providing the temperatures at said junction points are equal.

My invention further contemplates the separation of the junction points 7 into two groups 8 and 9, the currents established at the junction points embodied in group 8 being opposite to those established in group 9. Since there are no breaks in the connections between the junction points of the groups 8 and 9, it is not necessary to compensate for the usual external errors, thus affording an extremely high degree of accuracy in the measurement of temperature differences between said groups 8 and 9. The use of the thermo-couple elements 2, 2 as leads eliminates another source of error heretofore encountered, namely, the error at the point of connection between the external circuit and the thermo-couple elements 2, 2.

As an illustration of one method of mounting the flexible thermopile 1, reference is made to Figs. 1 and 2, wherein the junction points 7 of the groups 8 and 9 are mounted in an exposed surface 11 of supporting members 12 and 13 which may take the form of rigid hand grips. The supporting member 13 is tubular in form and it is provided with a sealing compound 14 for rigidly securing the portions of the thermo-couple elements 2 and 3 disposed therein in position. The remaining portions of the thermo-couple elements 2 and 3 disposed external to the hand grips 12 and 13 may be protected by a flexible tube 15, as shown in Fig. 2. The hand grip 12 is similar to the hand grip 13 but it is also provided with an axial extension 16, through which pass the instrument leads 5 and 6.

When it is desired to observe temperature differences between two points on a surface, the hand grips 12 and 13 are manipulated to bring the junction points 7 of the groups 8 and 9 into contact therewith, and since the thermo-couple elements 2 and 3 are flexible, the spacing between the two points of measurement may be varied at will.

Should it be desirable, however, to take a series of readings over a range of equally spaced points, I provide a clamping block 17 which serves to rigidly secure the groups 8 and 9 in any one of a plurality of predetermined positions, as shown in Figs. 1 and 2. The clamping block 17 comprises members 18 and 19 adjacent faces of which are provided with registering recesses 21 forming a plurality of openings 22 for the hand grips 12 and 13. A screw member 23, which extends through the member 19 into a threaded perforation 24 in the adjacent member 18, serves to secure said members detachably together.

While I have shown only one form of embodiment of my invention, for the purpose of describing the same and illustrating its principles of construction and operation, it is apparent that various changes and modifications may be made therein without departing from the spirit of my invention and I desire, therefore, that only such limitations shall be imposed thereon as are indicated in the appended claims or as are demanded by the prior art.

I claim:

1. A thermopile comprising a plurality of flexible positive and negative elements, certain junction points being disposed in groups, and a pair of supporting hand grips for said groups, one of said hand grips being extended to provide a support for at least one lead of said thermopile.

2. A thermopile comprising a plurality of elements, certain junction points of which are disposed in groups, grips for supporting the respective groups permitting a relative movement therebetween, one of said grips being extended to provide a support for the leads to said thermopile, and means operatively associated with said grips, whereby said groups may be secured in any one of a number of desired positions.

3. A thermopile comprising a plurality of flexible elements, certain junction points of which are disposed in groups, rigid supporting grips for said groups permitting relative movement therebetween, one of said grips having an axial extension, and means operatively associated with said grips, whereby said groups may be secured in desired relation.

4. A thermopile comprising a plurality of flexible elements defining at least two spaced junction points, and a pair of hand grips for supporting the respective junction points and permitting a relative movement therebetween, one of said hand grips having an exial extension.

5. A thermopile comprising a plurality of flexible elements defining at least two spaced junction points, a pair of rigid hand grips for supporting the respective junction points, and a flexible protective covering for the portions of said elements extending between said rigid hand grips, one of said hand grips having an axial extension.

6. A thermopile comprising a plurality of flexible elements connected in series circuit relation, alternate junction points being disposed in groups, a pair of rigid hand grips for so supporting the respective groups as to permit a relative movement therebetween, one of said hand grips being elongated to provide a support for the leads of said thermopile, a flexible protective covering for the portions of said elements disposed intermediate said hand grips, and a clamping device operatively associated with said hand grips for securing the same in a desired position.

CHARLES B. THWING.